United States Patent [19]

Stoeger et al.

[11] 4,392,936
[45] Jul. 12, 1983

[54] DEVICE FOR THE GALVANIC DEPOSITION OF ALUMINUM

[75] Inventors: Klaus Stoeger, Nuremberg; Siegfried Birkle, Höchstadt an der Aisch; Johann Gehring, Spardorf, all of Fed. Rep. of Germany

[73] Assignee: Siemens Aktiengesellschaft, Berlin & Munich, Fed. Rep. of Germany

[21] Appl. No.: 269,567

[22] Filed: Jun. 2, 1981

[30] Foreign Application Priority Data

Jun. 23, 1980 [DE] Fed. Rep. of Germany ....... 3023405

[51] Int. Cl.³ .............................................. C25D 17/20
[52] U.S. Cl. .................................................... 204/213
[58] Field of Search .......................................... 204/213

[56] References Cited

U.S. PATENT DOCUMENTS 4,066,515 1/1978 Stoeger ............................... 204/213

FOREIGN PATENT DOCUMENTS 977325 3/1951 France ................................ 204/213

Primary Examiner—T. M. Tufariello
Attorney, Agent, or Firm—Hill, Van Santen, Steadman, Chiara & Simpson

[57] ABSTRACT

Apparatus and method for the galvanic deposition of aluminum from aprotic organoaluminum electrolytes utilizing a rotatable galvanizing globe, a rotatable electrolyte container, and tubular connecting means joining said container and said globe to one another.

17 Claims, 2 Drawing Figures

DEVICE FOR THE GALVANIC DEPOSITION OF ALUMINUM

BACKGROUND OF THE INVENTION

The invention relates to a device and to a process for the galvanic deposition of aluminum from aprotic, organo-aluminum electrolytes which are free of oxygen and water.

A device and a process of this kind are known through the German Pat. No. 25 37 285. This known device includes of a heatable treatment trough which can be closed so as to be air-tight and which can be fed with an inert gas. A rotatable galvanizing drum is arranged inside the treatment trough, and a first container is connected to the treatment trough and serves to store the electrolyte. A second container is also connected to the treatment trough and serves to store a flushing liquid.

In this known device, the galvanizing drum must be removed from the galvanizing trough for loading and unloading, which is not only extremely complicated and time consuming, but also necessitates appropriately sized introduction and removal openings for the galvanizing drum.

As is known, air must be excluded from the organo-aluminum electrolyte which is produced under oxygen-free and hydrogen-free conditions. Any electrolyte contact with air, as a result of its reaction with oxygen and atmospheric moisture, results in a considerable reduction in the conductivity of the electrolyte and thus in its life duration. For this reason, galvanization using electrolytes of this kind must also take place under the exclusion of air. In the known device, this desired air exclusion can only be achieved by repumping the electrolyte back into its feed container in an inert or shield gas atmosphere following galvanization. Before the electrolyte is reintroduced into the galvanizing tank following the reloading of the galvanizing drum, the galvanizing tank must be flooded with an inert liquid and then returned to an inert gas atmosphere. This reintroduction process not only necessitates a considerable structural outlay but is also time consuming.

The German Pat. No. 25 37 256 and the German Pat. No. 27 16 805 disclose devices for the galvanic deposition of aluminum in which the components are treated in a galvanizing tank which is externally sealed and can be supplied with shield gas. The loading and the removal of the components which are to be galvanized is effected via airlock chambers which can be flooded with shield gas and which contain an externally operable workpiece transfer device. These known devices likewise necessitate a considerable structural outlay, and, in particular, the airlock chambers must be matched to the size of the components to be treated. Moreover, these known devices do not readily facilitate the treatment of bulk goods. In addition, it is extremely difficult to keep the airlocks completely sealed so that the danger always exists that the electrolyte will gradually suffer damage due to the diffusing in of air.

BRIEF SUMMARY OF THE INVENTION

The present invention is directed to new and very useful apparatus and processes adapted for the galvanic deposition of aluminum from aprotic, organoaluminum electrolytes which are free from oxygen and water. The invention employs a galvanizing globe and an electrolyte containers which are water connected together by a closable tubular connecting means. The assembly is rotatable about an axis of rotation which passes between said globe and said container to such an extent that electrolyte liquid is flowable from said container through said connecting means into said globe and vice versa.

A principal aim of this invention is to provide an improved device of the type described above so that not only can the structural outlay be substantially reduced, but also the possibility is largely prevented of having the electrolyte come into contact with air.

Other and further aims, objects, purposes, advantages, uses, and the like for the present invention will be apparent to those skilled in the art from the present application.

BRIEF DESCRIPTION OF THE DRAWINGS

The invention will be explained in detail making reference to accompanying drawings which provide a fundamental illustration of an exemplary embodiment.

DETAILED DESCRIPTION OF THE EMBODIMENT

Figure 1:
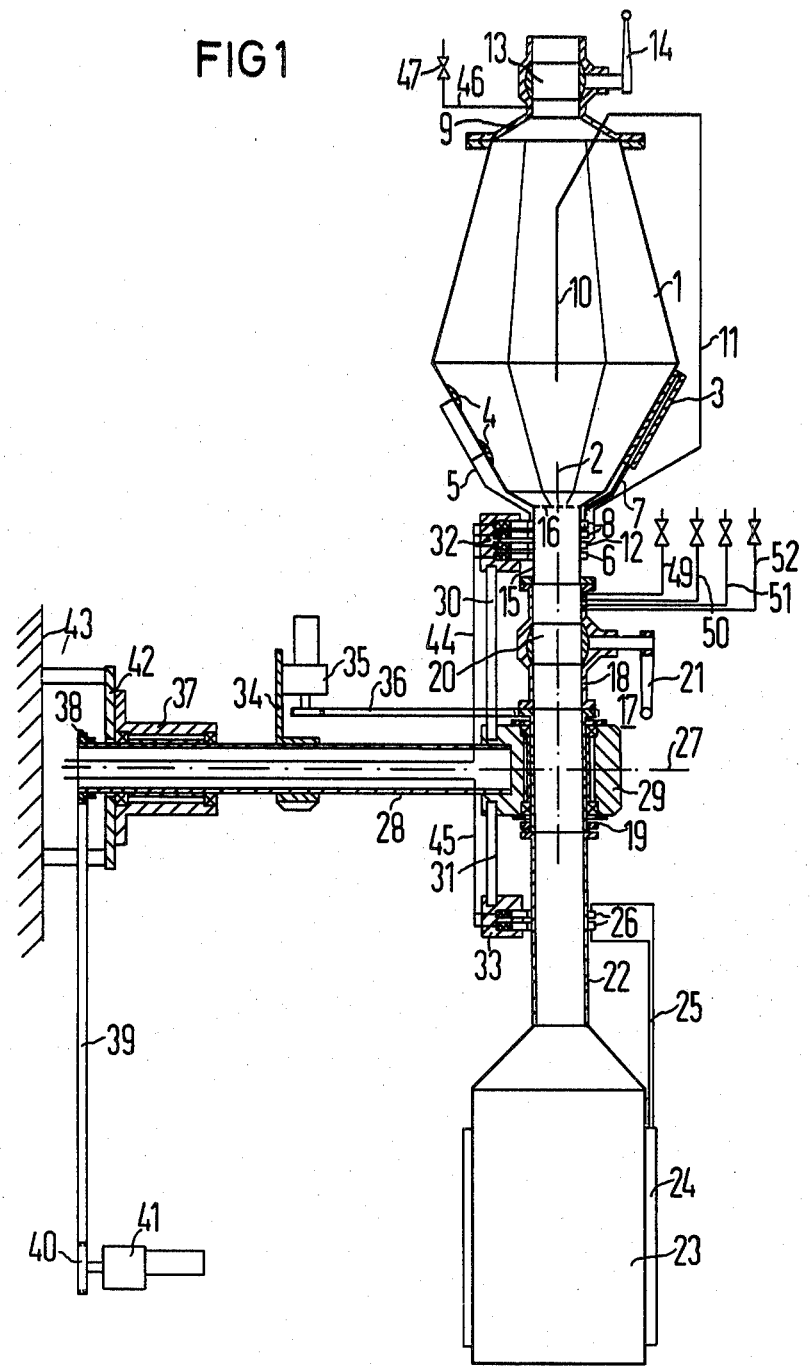
FIG. 1 is a longitudinal section through a device for the galvanic deposition of aluminum.

In accordance with the invention, an improved device of the type generally described above is provided which is characterized by a rotatable galvanizing globe which can be sealed so as to be gas-tight and which can be supplied with an inert gas. In addition, a rotatable electrolyte vessel is arranged in the same axis as the galvanizing globe, and is sealed so as to be gas-tight. The rotatable globe and the rotatable vessel are mechanically connected to one another via a closable, tubular connecting component and can be counter-currently pivoted about an axis of rotation which passes between the galvanizing globe and the electrolyte vessel to such an extent that, when the connecting component is open, at least a part of the electrolyte can flow from the electrolyte vessel into the galvanizing glove and vice versa.

Preferably, the galvanizing globe can be connected via lockable pipelines and valves to a container for inert gas and to two feed containers for inert liquids for displacing the air or inert gas out of the galvanizing globe and for washing the galvanized components in the galvanizing globe.

The device in accordance with the invention is advantageously operated in that, following the insertion of the components which are to be galvanized into the galvanizing globe which is preferably at best partially filled with inert liquid and the closure of same, the air is completely displacable by the introduction of further inert liquid. When the air has thus been completely displaced, the inert liquid returns to the container for the inert liquid and the volume of the inert liquid displaced in the galvanizing globe is supplemented by inert gas. Then the galvanizing globe and the electrolyte container are counter-currently pivoted, by the rotation of the connecting component, to such an extent that, following the opening of the connecting component, the electrolyte flows out of the electrolyte container into the galvanizing globe. Thereby, the inert gas so displaced flows into the electrolyte container. When the electrolyte has been introduced into the galvanizing globe, the connecting component is closed and the electrolyte container and the galvanizing globe are returned to their starting positions, and are rotated about their longitudinal axis for the aluminization of the components.

Preferably, following aluminization, the electrolyte is discharged from the galvanizing globe into the electrolyte container as a result of the opening of the connecting component, and the inert gas displaced from the electrolyte container flows back into the galvanizing globe in pressure compensating fashion. Following the closure of the connecting component, the galvanizing globe is entirely filled with inert liquid from the second container and the inert gas which is to be displaced returns to the assigned container as a result of the ventilation of the galvanizing globe.

In order that the galvanizing globe may be entirely discharged, it is pivoted to such an extent that the bulk goods can fall for example into a waiting container.

Advantageously two feed containers for the inert liquids are arranged above the galvanizing drum and two below so that the washing of the galvanized components following treatment, and the flooding of the galvanizing drum following emptying, can be carried out with the assistance of gravity.

Preferably, when two feed containers for the inert liquids are arranged above the galvanizing plane and two below, during the opening and emptying of the galvanizing globe, these liquids are pumped back from the lower containers into the upper containers.

The galvanizing globe and the electrolyte container connected thereto via the intermediate component can be connected to one another or separated from one another via a ballcock. Furthermore, they can be together rotated about their own longitudinal axis, as is necessary for the galvanization of the bulk goods, and, alternatively, they can be rotated about a center of rotation, so that selectively either the galvanizing globe is arranged above and the electrolyte container below, or else the electrolyte container is arranged above and the galvanizing globe below. In this way, it is possible, as a result of gravity, for electrolyte to flow out of the electrolyte container into the galvanizing globe, or, following galvanization, and, as a consequence, of a pivoting motion, for electrolyte to flow back into the electrolyte container. The galvanizing globe itself can also be filled with an inert liquid for the displacement of air, or with a suitable washing liquid for the washing of the galvanized components. Both the filling and the emptying of the galvanizing globe with displacement liquid or washing liquid is preferably effected by exploiting gravity so that a rapid filling and emptying is possible with the appropriate pipe-line cross-sections without the use of pumps. For this reason, two feed containers are in each case arranged above and below the galvanization plane. On the basis of the operating steps, it is now possible, during the galvanization time, to pump the inert liquids from the lower containers into the upper containers by relatively small pumps. Furthermore, the galvanizing globe can be connected to an inert gas feed container so that, when the galvanizing globe is emptied, with the given media, the volume can be supplemented by a substantially 100% pure inert gas atmosphere.

In FIG. 1, a galvanizing globe 1 composed of nonconductive material is rotatable about its longitudinal axis 2. The lower part of the galvanizing globe 1 can be heated by fluidic heating cartridges 3 arranged at the periphery. Inside the galvanizing globe are arranged cathodes 4 which lead via pipelines 5 to a slip ring 6. The heating cartridges 3 are also connected via wires or lines 7 to corresponding slip rings 8. The open galvanizing globe 1 is closed by a cover 9 through which an anode 10 leads into the interior of the galvanizing globe 1. The anode 10 is connected to a slip ring 12 via a wire 11.

The cover 9 is provided with a central closing mechanism in the form of a ballcock 13 for the loading and unloading of the parts or bulk goods which are to be treated. The ballcock 13 can be actuated by a handle 14.

The galvanizing globe 1 is provided with a connecting pipe 15 which is coaxial to the longitudinal axis 2 and which bears the slip rings 6, 8 and 12. The connecting pipe 15 is sealed off from the interior of the galvanizing globe 1 by a perforated partition wall 16 so that the material or parts to be galvanized are unable to enter the connecting pipe 15.

The connecting pipe 15 is connected to a tubular intermediate component 17 which for structural reasons consists of the two components 18 and 19, the component 18 possessing a ballcock 20 which can be actuated by a handle 21. The part 19 of the intermediate component 17 is attached to an electrolyte container 23 which is provided with a connecting pipe 22, which is arranged on the same axis as the galvanizing globe 1 and which rotates together with the latter about the longitudinal axis 2. The electrolyte container 23 is provided with an outer heating unit 24. This can likewise be equipped with heating cartridges. The current is supplied via electric wires or lines 25 which lead to slip rings 26 which are attached to the connecting pipe 22.

The electrolyte container 23, which is connected to the galvanizing globe 1 via the connecting component 17, can be pivoted, together with the galvanizing globe 1, about an axis of rotation 27 and in practice by means of a hollow shaft 28 at one end of which is mounted a bearing block 29 in which the tubular part 19 of the intermediate component 17 is arranged so as to be rotatable and secured against axial displacement. The bearing block 29 is provided with tubular carriers 30 and 31 which bear the brush holders 32 and 33.

The hollow shaft 28 also bears a bracket 34 for a motor 35 which is drive connected to the part 19 of the intermediate component 17 via a driving belt, for example, a toothed belt. The other end of the hollow shaft 28 is rotatably mounted in a bearing block 37 and bears a drive wheel 38 which is drive connected to a motor pinion 40 via a driving belt 39. The motor pinion 40 is driven by a motor 41. In the exemplary embodiment illustrated in FIG. 1, the bearing block 37 is attached to a wall bracket 42. The motor 41 can also be attached to a wall 43.

The brushes of the brush holders 32 and 31 which are connected to the slip rings 6, 8, 12 and 26 are connected via electric lines 44 and 45 to corresponding terminals which lead to these through the hollow shaft 28.

The galvanizing globe 1 is connected via a pipeline 46 and a valve 47 to an inert gas container 48 as will be explained in detail making reference to FIG. 2. The pipeline 46 shown in FIG. 1 is connected in known manner via a fast acting coupling to the loading and unloading pipe of the cover 9.

Similarly, the tubular part 18 of the intermediate component is provided with a corresponding terminal for fast acting couplings in order to be able to connect the pipelines 49 to 52. In itself, it is sufficient for the tubular part 18 to be equipped only with one coupling component. However, in order to be able to operate the system rapidly and reliably, it is expedient to provide separate fast acting couplings for all the pipelines 49 to 52.

As can be seen from FIG. 2, the pipeline 49 leads, for example, via a valve 53 to a feed container 54 for inert liquid 55 which is used, for example, to flood the galvanizing globe 1 as will be explained in detail later in the description. The feed container 54 is provided with a ventilating valve 56.

The pipeline 50 is connected via a valve 57 to a second feed container 58 which contains inert liquid 59 which serves to wash the components following galvnization.

The pipeline 51 is connected via a valve 60 to a container 61 in which the inert liquid 55 used to flood the galvanizing globe 1 can be discharged. The pipeline 52 is connected to a further container 64 via a valve 63. The containers 61 and 64 possess ventilating valves 62 and 65. Conveyor pumps 68 and 69 can be used to pump back via pipelines 66 and 67 the inert liquids 55 and 59 which have been discharged into the containers 61 and 64. Preferably, the containers 54 and 58 are arranged above the galvanizing globe, whereas the containers 61 and 64 are arranged below it.

The electrolyte container 23 can be configured in such a way that its volume is greater than the quantity of electrolyte required for galvanization. The introduction of the electrolyte into the electrolyte container 23 can, for example, be effected in such manner that, when the ball valve 20 is open, following the flooding of the galvanizing globe and of the electrolyte container and of the intermediate component 17 with inert liquid 55 from the inert container 54, having been discharged into the container 61, this liquid is brough under an inert gas atmosphere from the container 48 as a result of the opening of the valve 60 and the opening of the valve 47. Now the electrolyte can be introduced via one of the fast acting coupling in the part 18 of the intermediate component 17 with the valve 47 open, and the inert gas atmosphere displaced by the electrolyte is compressed into the inert gas container 48. Following the closure of the ballcock 20 and the flooding of the galvanizing globe 1 with inert liquid from the container 54, the inert gas can be displaced into the inert gas container 48 via the open valve 47. Following the opening of the ballcock 13, the inert liquid can be discharged into the container 61 as a result of the opening of the valve 60. Preferably, however, only half the liquid 55 is discharged, so that the galvanizing globe is still half filled with inert liquid 55. The goods or work pieces to be galvanized are now introduced into the galvanizing globe. Following the loading of the galvanizing globe 1, via the ballcock 13, the remaining air in the galvanizing globe 1 is displaced by a further addition of inert liquid 55 from the container 54 as a result of the opening of the valve 53.

When the remaining air in the galvanizing globe 1 has been eliminated, the valve 13 is closed, and inert liquid 55 contained in the galvanizing globe 1 is displaced into the container 61 as a result of the opening of the valve 60. The volume in the galvanizing globe 1 is supplemented by an inert gas atmosphere such as $N_2$ from the inert gas container. For this purpose, the valve 47 must be opened.

Now the pipelines 46 and 49 to 52 are clamped off and the galvanizing globe 1 and electrolyte container 23 are pivoted about the axis of rotation 27 so that the galvanizing globe 1 is arranged below and the electrolyte container 23 above. Therefore, when the ballcock 20 is opened, the electrolyte can flow out of the electrolyte container 23 into the galvanizing globe 1, and the $N_2$ atmosphere displaced out of the galvanizing globe 1 can flow into the electrolyte container 23. A refilling can proceed all the faster the deeper the galvanizing globe 1 is pivoted and the higher the electrolyte container 23 is pivoted. Pivoting is effected with the aid of the motor 41 via the driving belt 39. Preferably the motor 41 is designed as a stepping motor so that the angle of pivot can be predetermined by an appropriate number of pulses.

Figure 2:
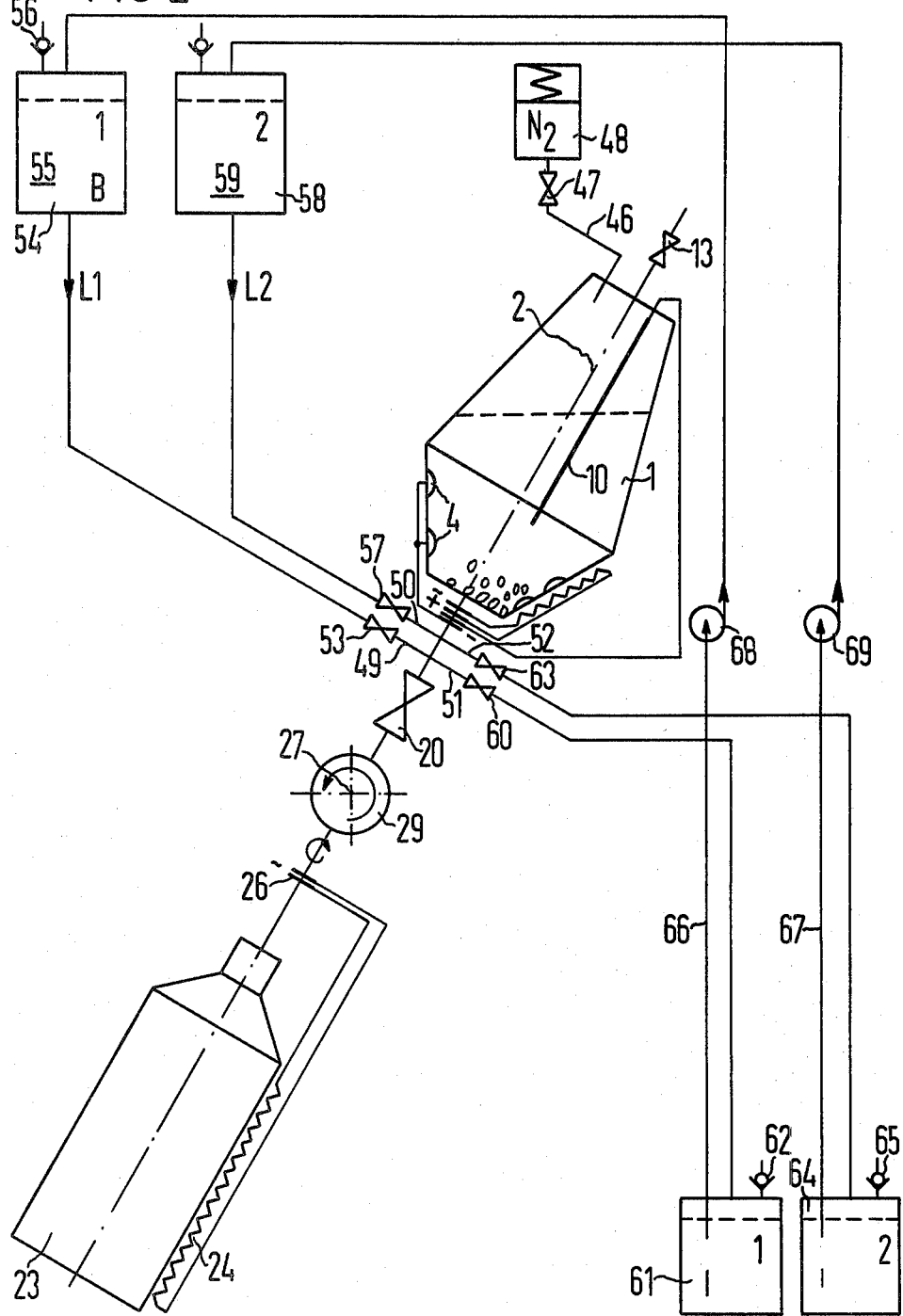
FIG. 2 is a fundamental illustration of the device shown in FIG. 1 with the associated feed containers.

Following the closure of the ballcock 20, the galvanizing globe 1 and the electrolyte container 23 are rotated back into the starting position illustrated in FIG. 2. For purposes of galvanization, the motor 35 is switched on which now, via the driving belt 36, rotates the galvanizing globe 1 together with the electrolyte container 23 about the longitudinal axis 2.

At the end of the aluminization, the ballcock 20 is opened, and the electrolyte contained in the galvanizing glove 1 is discharged into the electrolyte container 23. Also, the inert gas atmosphere displaced from the electrolyte container 23 accumulates in the galvanizing globe 1. Following the transfer of the electrolyte into the electrolyte container, the ballcock 20 is closed. After the opening of the valve 57, the inert liquid 59 provided for washing purposes is evacuated from the container 58 via the pipeline 50 into the galvanizing globe 1, and inert gas atmosphere which is displaced from the galvanizing globe 1 is returned to the inert gas container 48 following the opening of the valve 47. Then the inert liquid contained in the galvanizing globe 1 is outlet into the container 64 via the pipeline 52 and the valve 63 while the galvanizing globe 1 is ventilated. The galvanizing globe 1 can then be opened and unloaded. For this purpose, the galvanizing globe 1 can again be pivoted in a clockwise direction so that the bulk goods can be emptied into a waiting container. However, all the pipelines must be clamped off for this purpose. Following the pivoting of the galvanizing globe 1 back into the starting position illustrated in FIG. 2, the galvanizing globe 1 can, if required, be reloaded with bulk goods, in which case the steps are repeated in the described sequence.

In the meantime, the inert liquids discharged into the containers 61 and 64 are returned into the upper, assigned containers 54 and 58 with the aid of the pumps 68 and 69. Expediently, the containers 54 and 58 are larger than the containers 61 and 64 so that the return of the inert liquids 55 and 59 from the containers 61 and 64 need not be carried out until during the galvanizing operation.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth in the here to appended claims.

We claim:

1. Apparatus for the galvanic deposition of aluminum from aprotic, organoaluminum electrolytes which are free of oxygen and water, comprising a galvanizing globe which is closable so as to be gas-tight, an electrolyte container which is in spaced, adjacent relationship to said galvanizing globe and is closable so as to be gas-tight, said globe and said container being connected to one another via a closable, tubular interconnecting means which is rotatable about its longitudinal axis together with said globe and said container, and which is also counter-currently pivotable about an axis of rotation passing between said globe and said container to such an extent that a liquid electrolyte is flowable from said container through said tubular interconnecting means into said globe and vice versa.

2. The apparatus of claim 1, wherein said galvanizing globe and said electrolyte container are rotatable in any oblique position.

3. The apparatus of claim 1 wherein said electrolyte container is volumetrically larger than the quantity of electrolyte desired for a given galvanization.

4. The apparatus of claim 1 wherein said galvanizing globe and said electrolyte container are heatable by a heating means.

5. The apparatus of claim 1 wherein said galvanizing globe is connectable via clampable pipelines and valves to a container for inert gas and to two feed containers for respective inert liquids for the displacement of gas from said galvanizing globe and for the washing of galvanized components in said galvanizing globe.

6. The apparatus of claim 5 wherein container means for said inert liquids are arranged above the galvanizing plane and further container means are arranged below said galvanizing plane.

7. The apparatus of claim 6 wherein said further container means are connected to said container means via pump means.

8. The apparatus of claim 1 wherein said galvanizing globe is closed by a cover means which has a central locking mechanism for the loading and removal of components being galvanized.

9. The apparatus of claim 8 wherein said central locking component is a ballcock.

10. The apparatus of claim 8 wherein an anode extends into the interior of said galvanizing globe and which is connected from the exterior by an insulated duct extending through said cover means.

11. The apparatus of claim 1 wherein said tubular connecting means is provided with a valve means.

12. The apparatus of claim 1 wherein said galvanizing globe and said electrolyte container each possess a respective connecting pipe which is coaxial with said axis of rotation for flange attachment to said tubular connecting means.

13. Apparatus for the galvanic deposition of aluminum from aprotic ogranoaluminum electrolytes which are free of water and oxygen comprising:
(A) a rotatable gas-tight globe;
(B) a rotatable electrolyte container;
(C) tubular connecting means interconnecting said globe and said container at respective end adjacent portions of said tubular connecting means, said tubular connecting means having a longitudinal axis, said tubular connecting means being adapted for transfer therethrough of fluid from one of said globe or said container to the other thereof;
(D) support means for holding said tubular connecting means for rotatable movements about said longitudinal axis, said support means having a support axis which extends generally perpendicularly to said longitudinal axis, said support means being rotatable about said support axis;
(E) first drive means for imparting rotational movements to said tubular connecting means about said longitudinal axis whereby said globe, said container, and said tubular connecting means are rotatable;
(F) second drive means for imparting rotational movement to said support means about said support axis whereby a predeterminable exchange flow of fluids can occur from one of said globe or said container to the other thereof as desired;
(G) valve means in said tubular connecting means between said globe and said container;
(H) port means including closure means for charging desired inert fluids to, and for removing said fluids from, said globe;
(I) anode and cathode means associated with said globe for passing a current through an electrolyte in said globe.

14. Apparatus for the galvanic deposition of aluminum from aprotic, organoaluminum electrolytes which are free of oxygen and water comprising a galvanizing globe which is closable so as to be gas-tight, an electrolyte container which is in spaced, adjacent relationship to said galvanizing globe and which is closable so as to be gas-tight, a closable, tubular means interconnecting said globe and said container along a common axis, bearing means mounting said tubular means for rotational movements thereof with said globe and said container about said common axis, shaft means connected to said tubular connecting means for pivoting said tubular connecting means about a shaft axis which passes between said globe and said container whereby a liquid electrolyte is flowable from said container through said tubular means and into said globe and vice versa responsively to pivotal movements of said shaft means about said shaft axis.

15. The apparatus of claim 14 wherein said shaft means supports a motor means for driving said tubular means about said common axis, said motor means being interconnected with said tubular means by drive belt means.

16. The apparatus of claim 15 wherein said tubular means at opposing respective end portions thereof is provided with anode and cathode slip ring means for the supply to each of said container and said globe of heating electric current.

17. The apparatus of claim 16 wherein said shaft means is hollow and through said shaft means extends connecting electrical conducting lines, and wherein exterior circumferential portions of said shaft support brush means with interconnecting means for said conducting lines and which lines coact with said slip ring means to provide such heating electric current for said container and said globe.

* * * * *